Oct. 20, 1931.  B. J. MAHONEY  1,828,505
COUPLING
Filed Sept. 6, 1928
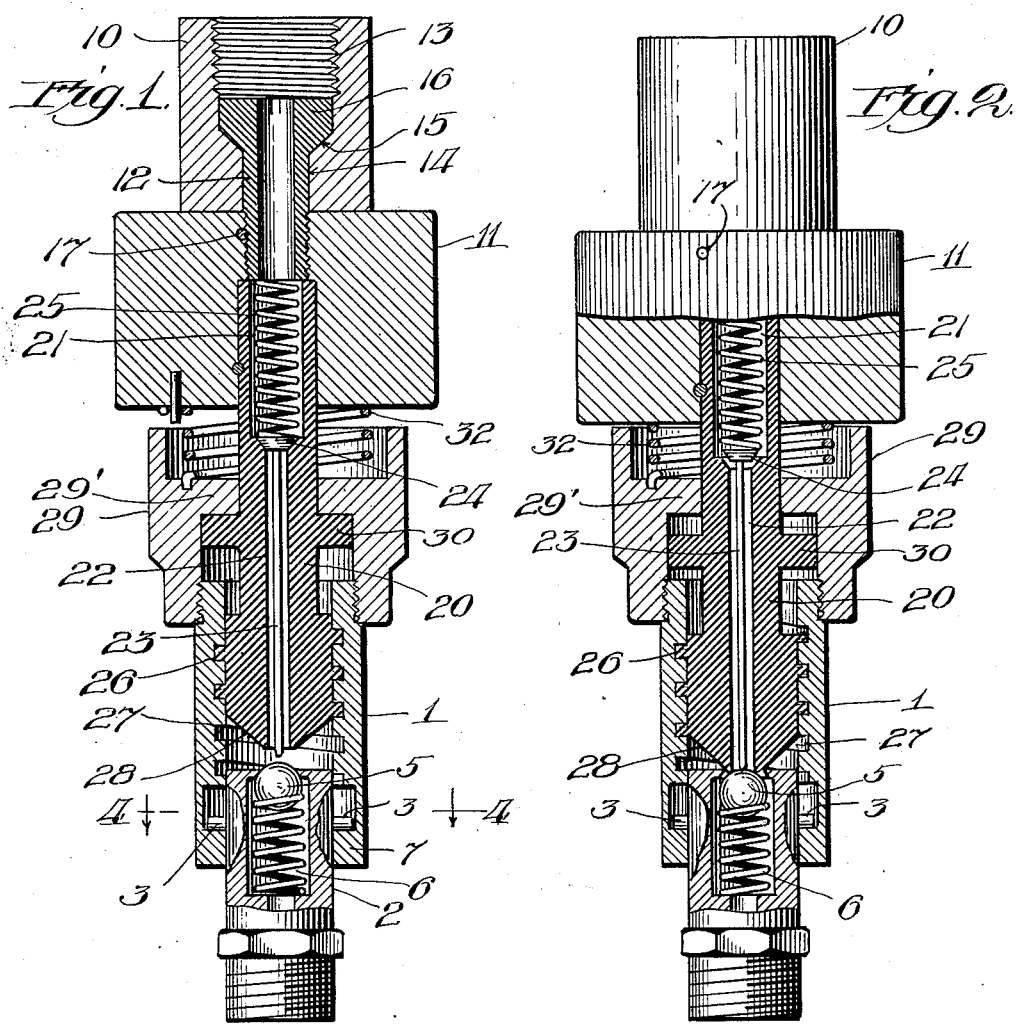
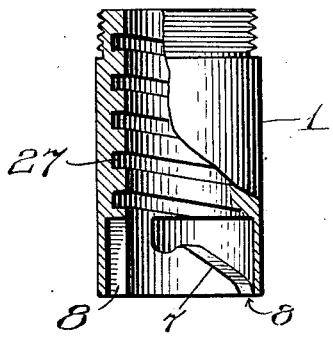
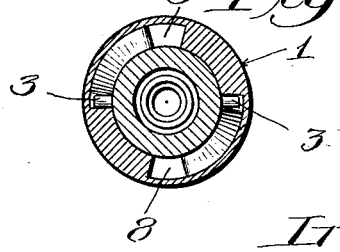
Inventor
Burton J. Mahoney,
by Wm. F. Freudenreich
Atty Patented Oct. 20, 1931

1,828,505

UNITED STATES PATENT OFFICE

BURTON J. MAHONEY, OF CHICAGO, ILLINOIS, ASSIGNOR TO HOFFMAN HIGH PRESSURE EQUIPMENT COMPANY, A CORPORATION OF ILLINOIS

COUPLING

Application filed September 6, 1928. Serial No. 304,223.

The present invention relates to means for quickly connecting a conduit to another element in such a manner that a fluid-tight joint will be made; and it has for its object to produce a simple, novel and efficient construction for this purpose.

One field of use for the invention is in the lubrication of bearings having lubricant receptacles to which conduits are adapted to be attached when lubricants are to be injected. Viewed in one of its aspects my invention may be said to have for its object to produce a simple, novel and efficient coupling for connecting a conduit to a receptacle adapted to receive a lubricant, whereby a sealed joint may be obtained with receptacles differing more or less from each other.

The various features of novelty whereby my invention is characterized will hereinafter be pointed out with particularity in the claim; but, for a full understanding of my invention and of its objects and advantages, reference may be had to the following detailed description taken in connection with the accompanying drawings, wherein;

Figure 1 is a longitudinal center section through a device arranged in accordance with my invention, interlocked with a receptacle with which a coupling is to be made; Figure 2 is a view similar to Figure 1, showing the parts in the positions which they occupy when the coupling is completed; Figure 3 is a view partially in elevation and partially in section of the socket member of my improved device; and, Figure 4 is a section taken approximately on line 4—4 of Figure 1.

Referring to the drawings, 1 represents a socket member adapted to fit over, and be interlocked with, the receptacle 2 to which a fluid is to be delivered. In the arrangement shown, the receptacle is in the form of a nipple, having two pins, 3 projecting therefrom at diametrically opposed points, and having in the top a ball check valve 5 held up by means of a spring 6. The socket is, therefore, provided with internal inclined ledges 7 interrupted by diametrically opposed windows or openings 8. When the socket is slipped down over the receptacle with the openings registering with the pins on the latter, and is then turned, the pins will ride up over the inclined ledges, causing the receptacle and the socket to be mechanically interlocked.

The conduit through which fluid is to be supplied is adapted to be screwed into a block 10 that is attached to a cylindrical head 11 by means of a tubular screw 12; the block having extending through the same a cylindrical bore of larger diameter at one end, as indicated at 13, and of reduced diameter at the other end, as indicated at 14. The sections 13 and 14 of the bore are joined by a short frusto-conical section 15. The stem of the screw 12 fits the part of the bore of small diameter in the block 10, while the head 16 of the screw fits the conical section of the bore. The parts are accurately machined so that the block may rotate freely about the long axis of the screw without permitting leakage of the fluids passing through the device, even though they be under high pressure. After the screw has been properly adjusted it may be locked in place by means of a suitable pin 17.

A long nozzle member 20 is fixed at one end in the head 11 so as to be aligned with the screw 12 and receive from the latter fluids to be discharged from the nozzle. In the upper end of the nozzle is a chamber 21 of considerable diameter from the bottom of which extends a smaller passage 22, open at the lower end of the nozzle. In the passage 22 is the stem 23 of a check valve 24 located in the chamber 21. The spring 25, above the check valve, normally holds the latter closed. The valve stem normally projects a short distance below the lower end of the nozzle, so that it may be pushed up from below, and thus unseat the valve. The lower end of the nozzle is made frustoconical, as indicated at 28, so that when it is pressed down against the receptacle when in axial alignment therewith, it will enter the opening in the receptacle and form a seal with the edge bounding the opening. The lower part of the nozzle is provided with a coarse external thread 26 meshing with the complementary internal thread 27 in the socket 1.

It will be seen that if, after the socket has been interlocked with the receptacle as shown in Fig. 1, the nozzle is screwed down toward the receptacle, it may be forced into the opening in the latter with any desired degree of pressure, the nozzle pushing down when the socket is pulling up against the pins 3. As the nozzle approaches its seat on the receptacle, it pushes down the check valve 5 which, because the spring below the same is stronger than the spring above the valve in the nozzle, pushes up or opens the valve in the nozzle. The conditions are then such as indicated in Fig. 2.

It will thus be seen that I am able, first, to produce a mechanical interlocking between the conduit, of which the nozzle forms a part, and the receptacle; and, second, then to establish communication between the interior of the conduit and the interior of the receptacle, effectually sealing the joint between them so as to prevent leakage.

In the arrangement shown, the socket is prevented from being completely unscrewed from the nozzle by means of a cylindrical shell 29 surrounding the nozzle above the socket and screwed upon or otherwise attached to the upper end of the socket. The shell contains a transverse partition 29' between its ends. The internal diameter of the shell is larger than the body of the nozzle so as to provide within the same, above the top of the socket and below the partition, a chamber into which extends a flange or collar 30 on the nozzle. The flange or collar is thinner than the heighth of this chamber, so as to permit the flange and, therefore, the nozzle to move up and down.

External cylindrical surfaces of the shell 29, and the head 11 are preferably knurled or otherwise roughened so that they may be securely gripped. Applying the device to a receptacle, the parts 11 and 29 will ordinarily be held in the hand until the device has been interlocked with the receptacle as indicated in Fig. 1. Then, while the part 29 is held stationary in one hand, the head 11 will be turned to bring about the condition illustrated in Fig. 2. However, with such an interlocking between the socket and the receptacle as illustrated, it is unnecessary for the user to hold the socket or the part 29 when the nozzle is being screwed down.

In the arrangement shown, I have placed between the members 11 and 29 a torsion spring 32, lying mainly within the chamber in the shell above the partition in the latter. One end of the spring is anchored to the member 29, while the other end is anchored to the member 11. The spring tends constantly to hold the members 11 and 29 in the relative angular positions indicated in Fig. 1, namely, with the flange or collar 30 bearing against the partition 29'. When the head is turned to screw down the nozzle, energy is stored in the spring so that, upon releasing the head, the spring will turn it backwards and screw the nozzle up.

It will thus be seen that I have produced a simple, novel construction that permits the conduit to be tightly coupled to receptacles or the like even though, due to wear or differences in dimensions, the receptacles are not all exactly alike.

It will also be seen that, because the operating member 11 for the sealing element is much larger in diameter than the screw-threaded portion of the latter, the turning force on the screw operates through the lever. Therefore, since the screw thread is coarse, the sealing member may be quickly seated under great pressure, by applying only a small force to the operating member.

While I have illustrated and described in particularity only a single preferred form of my invention, I do not desire to be limited to the exact structural details thus illustrated and described; but intend to cover all forms and arrangements coming within the definitions of my invention constituting the appended claim.

I claim:—

In combination, a sleeve adapted to be slipped over a receptacle and be interlocked therewith, a tubular element screw-threaded into the sleeve and having one end constructed and arranged to effect a seal between the same and the receptacle when said tubular element is screwed into the sleeve after the latter has been attached to the receptacle, a head fixed to the other end of said tubular element, a block overlying the head and constructed for attachment to a supply conduit, a tubular headed screw extending axially through said block and into said head, and means for locking the screw to the head in position to permit the block to turn freely about the screw.

In testimony whereof, I sign this specification.

BURTON J. MAHONEY.